Sept. 8, 1970    H. A. PENHASI ET AL    3,527,542

CARDIAC OUTPUT APPARATUS

Filed June 15, 1966    4 Sheets-Sheet 1

HARRY A. PENHASI
CON D. RADER
INVENTORS

BY *Louis Mok*

ATTORNEY

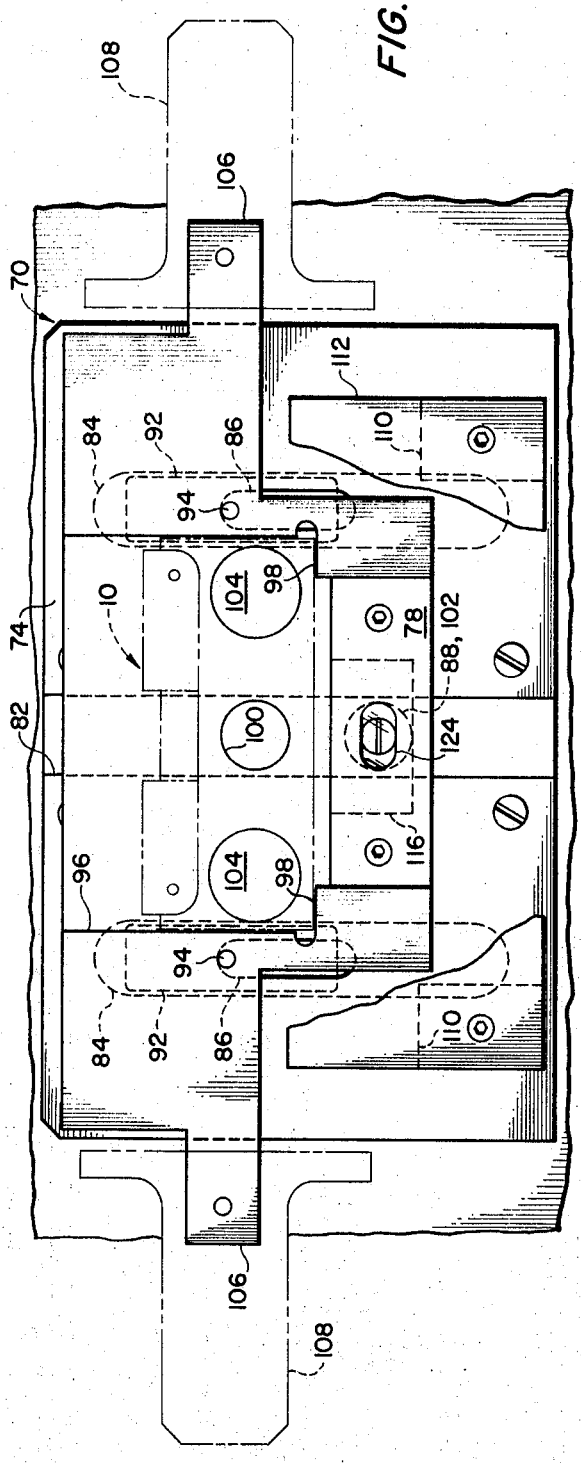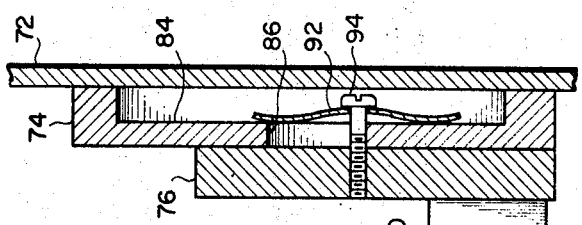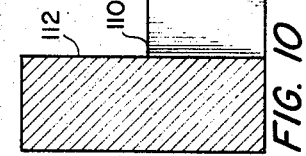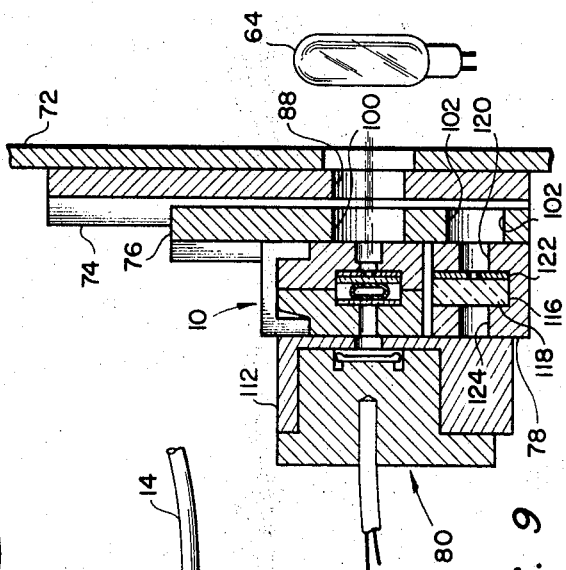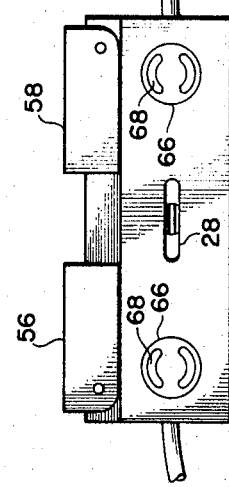

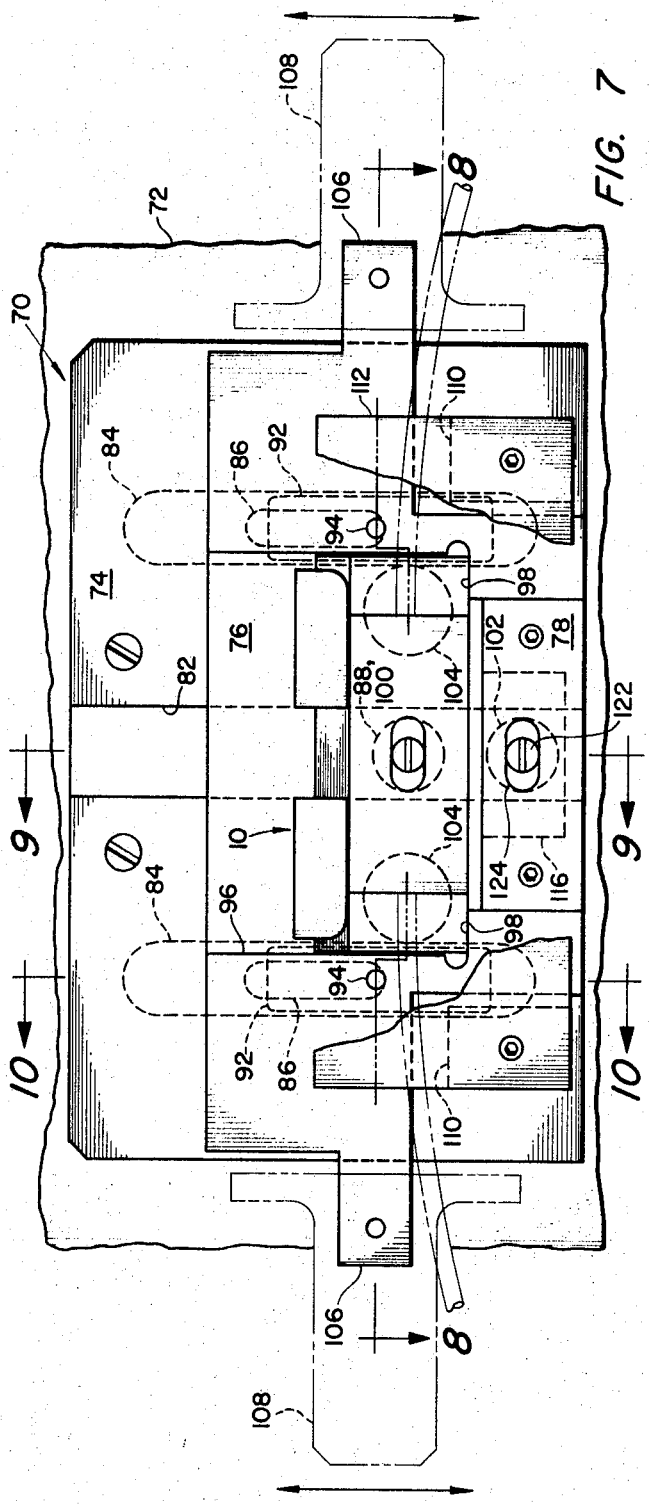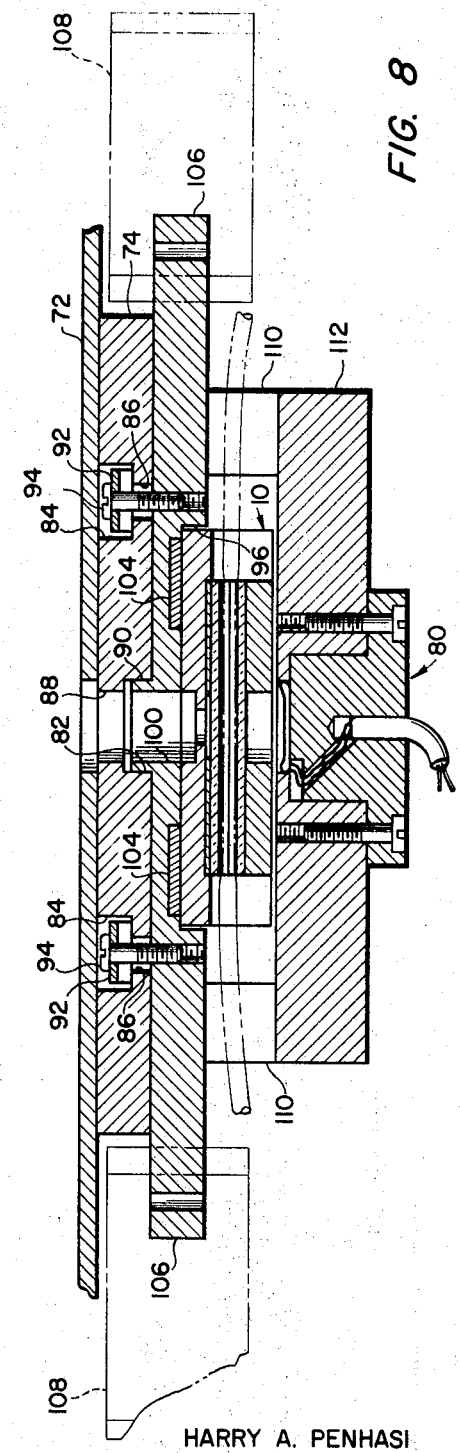

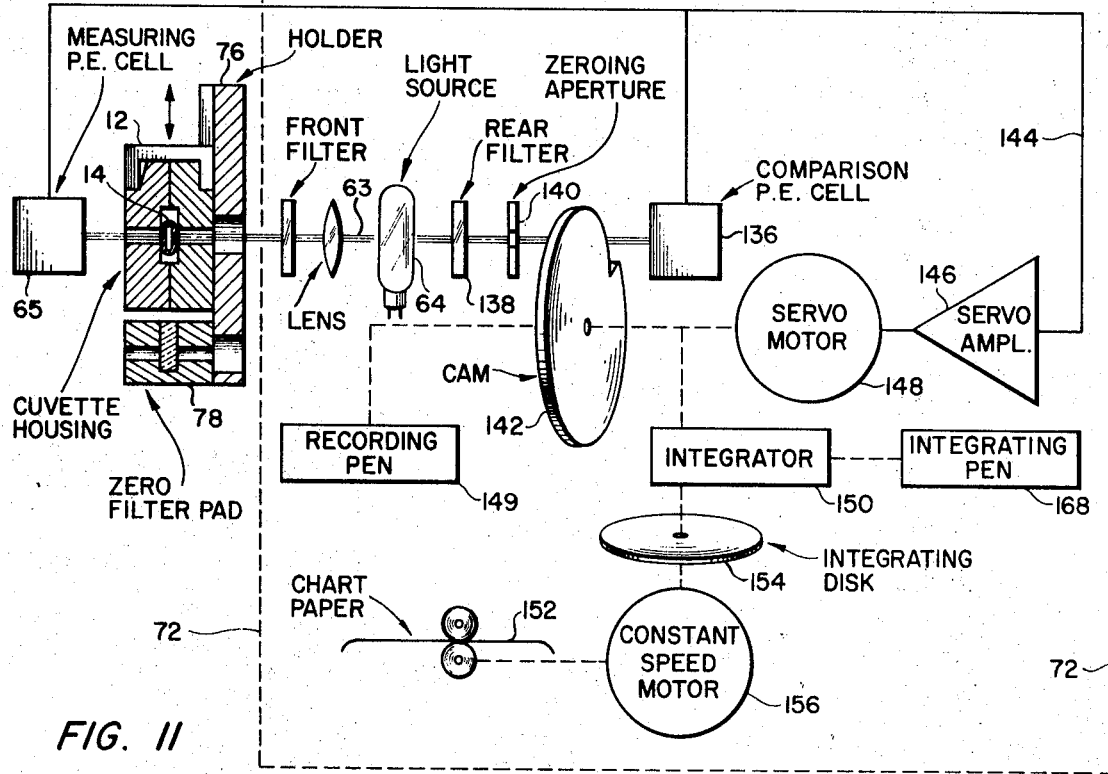
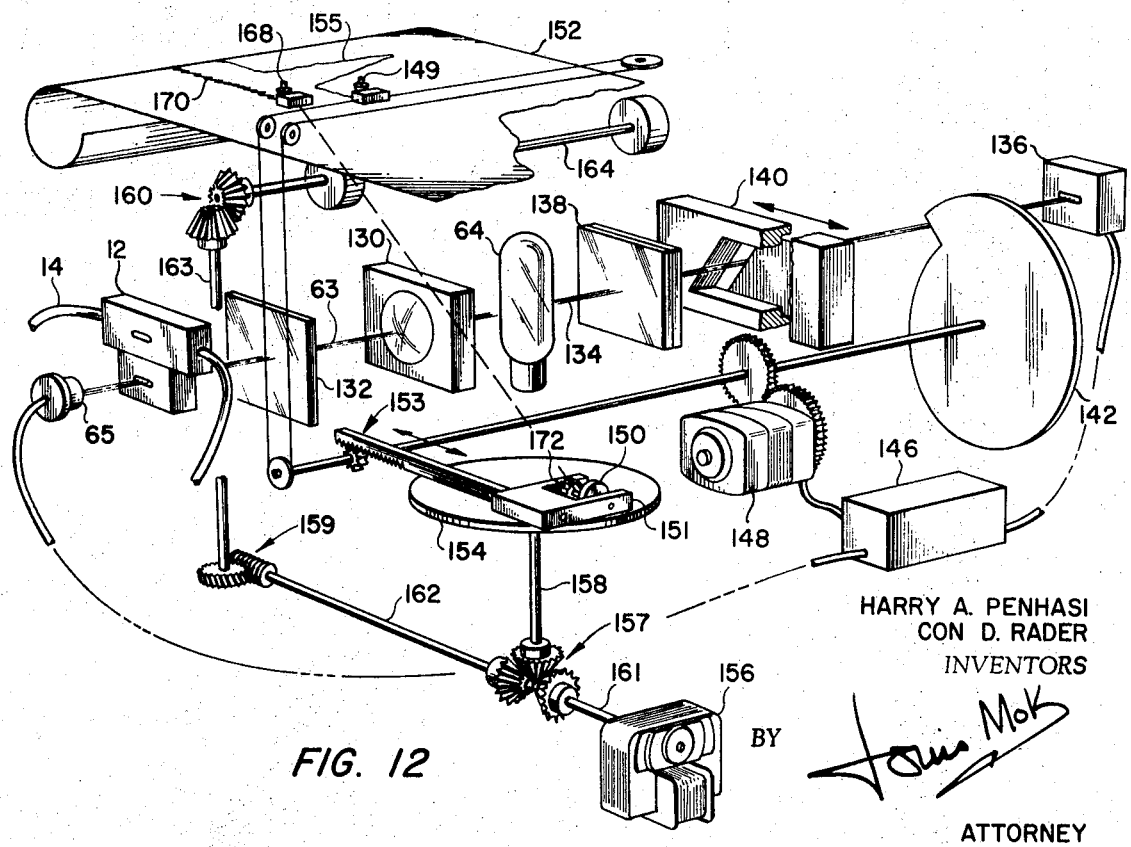

United States Patent Office

3,527,542
Patented Sept. 8, 1970

3,527,542
CARDIAC OUTPUT APPARATUS
Harry A. Penhasi, Cupertino, and Con D. Rader, San Jose, Calif., assignors to Beckman Instruments, Inc., a corporation of California
Filed June 15, 1966, Ser. No. 557,823
Int. Cl. G01n 21/16, 33/16; A61b 5/02
U.S. Cl. 356—244                2 Claims

ABSTRACT OF THE DISCLOSURE

A cuvette housing including a first plate having an interior surface with a recessed portion extending the length of the plate and an aperture through the plate in communication with the recessed portion, a second plate having an interior surface and an aperture and means for clamping the plates together with the interior surfaces in contact whereby the recessed portion in the first place defines a through-passage and the apertures are brought into alignment.

---

Figure 1:
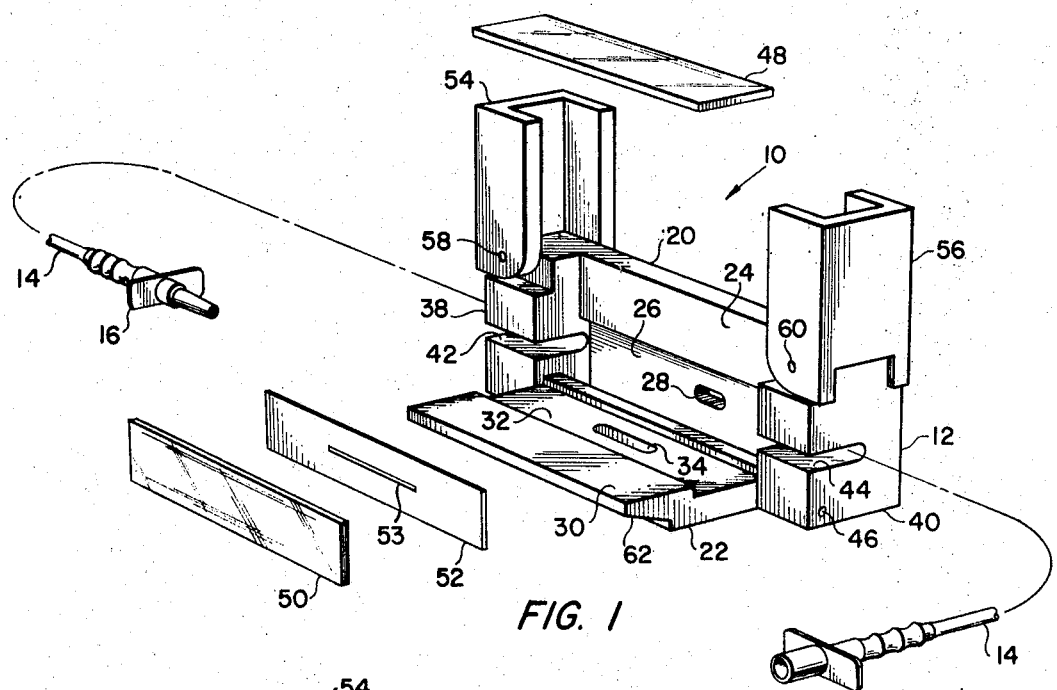

This invention relates generally to apparatus for measuring cardiac output, or blood flow, in animal subjects, and more particularly, to cuvette apparatus adapted to support disposable, flow-through cuvettes in proper orientation with respect to the photometric analyzers forming part of cardiac output apparatus.

The volume of blood pumped by the heart per unit of time, called the cardiac output, is an increasingly important parameter in heart research and in the diagnosis, surgery and post-operative care of heart patients. For example, the determination of cardiac output is often useful in localizing and quantitating cardiac shunts.

Various methods have been devised for measuring cardiac output. In one method, called the indicator dye dilution technique (sometimes referred to as the Stewart-Hamilton technique), a few cubic centimeters of dye, examples of which include indocyanine, tricarbocyanine and sodium iodide, are injected rapidly into a large vein and the arterial concentration of this dye is measured and recorded over a short interval of time. This technique provides an average value of cardiac output over the interval and may be calculated from the expression:

$$F = \frac{y_0}{\int_0^t c\, dt}$$

where $F$ = cardiac output, or blood flow, in liters per second;
$y_0$ = amount of dye injected, in mg.; and
$c$ = concentration of dye in the blood, in mg. of dye per liter of blood.

One type of apparatus developed for the measurement of concentration of the dye in the blood is the flow-through cuvette densitometer. This apparatus measures the optical density of a flowing sample of the blood-dye mixture extracted from the arterial side of the heart and passed through a cuvette mounted between a source of radiant energy and a photoelectric cell. The radiation incident on the photoelectric cell is directly dependent upon the energy transmission characteristics of the sample which, in turn, is a function of the dye concentration.

Flow-through cuvettes of the prior art, however, are permanent in nature and therefore require cleaning and sterilization each time they are used. The cleaning and sterilizing processes, which are often times elaborate, increase the chance of contamination making it impossible to reinfuse the blood into the subject. This is especially a problem with subjects having relatively limited blood supplies such as infants and small animals. One object of the present invention is to overcome the aforementioned difficulties.

Another object of the present invention is to provide a cardiac output measuring apparatus, employing the dye-dilution technique, in which a pre-sterilized, disposable, low cost cuvette is used.

Figure 2:
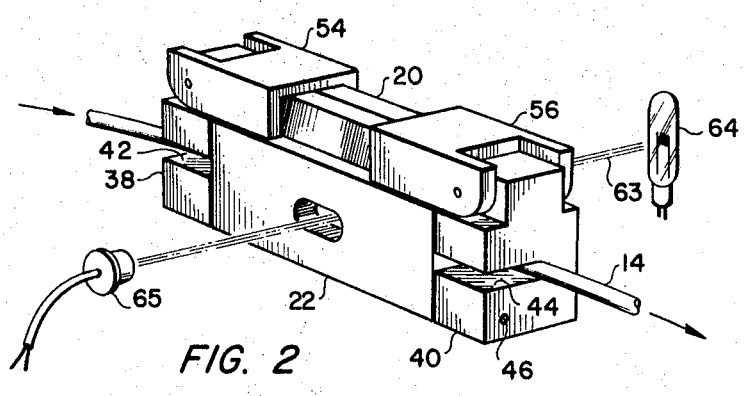
Figure 3:
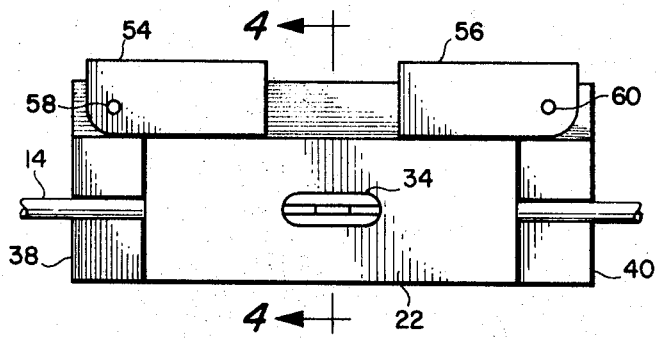
Figure 4:
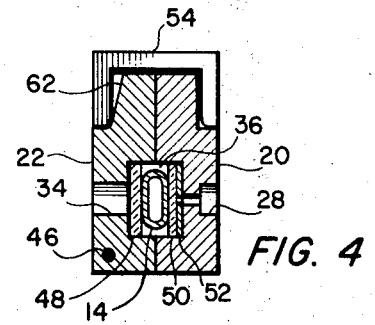

The novel features which are believed to be characteristic of the invention are set forth with particularity in the appended claims. The invention itself however, together with further objects and advantages thereof can best be understood by reference to the following description taken in connection with the accompanying drawings in which:

FIG. 1 is an exploded view of a cuvette assembly in accordance with one aspect of the present invention;
FIG. 2 is a perspective view of the assembly of FIG. 1 in the closed position;
FIG. 3 is a front elevation view of the cuvette assembly;
FIG. 4 is a cross-sectional view of the assembly of FIG. 3 taken along the plane 4—4;
FIG. 5 is a rear view of the housing of FIG. 3;
FIG. 6 is a front view of a cuvette assembly holder and support in accordance with another aspect of the present invention showing the holder at the upper limit in the "stand-by" position;
FIG. 7 is a front view of the assembly of FIG. 6 showing the cuvette assembly in place in the holder with the holder at the lower limit in the "run" position;
FIG. 8 is a cross-sectional view of the apparatus of FIG. 7 taken along the plane 8—8;
FIG. 9 is a cross-sectional view of the apparatus shown in FIG. 7 taken along the plane 9—9;
FIG. 10 is a cross-sectional view of the apparatus of FIG. 7 taken along the plane 10—10;
FIG. 11 is a schematic view of a cardiac output measuring apparatus according to the present invention; and
FIG. 12 is a perspective view of the apparatus shown schematically in FIG. 11.

Referring now to the drawings in detail, there is shown in FIGS. 1–5 a cuvette assembly 10 comprising generally a housing 12 and a sample holder or cuvette 14 held in the housing 12. For purposes of measuring cardiac output, the cuvette 14 will take the form of a flow-through tube. It is to be understood however, that the present invention is not limited to flow-through cuvettes and that closed-ended tubes containing discrete samples may be handled by the apparatus with equal facility.

The cuvette 14 may be fabricated of medical grade vinyl tubing which is both flexible and transparent. The tubing may be cut into individual lengths of 18 to 20 inches, sterilized and packed in sealed, sterile containers for future use. Vinyl tubing having the stated length and an outside diameter of about ⅛ inch will have an internal volume of about 2 cc. Each tube may be provided at its ends with standard male and female plastic fittings 16 and 18 for connecting the tube to other apparatus. An important advantage of the above-described cuvette is that it may be discarded after use at negligible expense.

The housing 12 is defined generally by a rear plate or wall 20 and a front wall or cover plate 22 which is movable between open and closed positions with respect to the rear wall 20. The interior surface of the rear wall 20 has an abutment portion 24 and a recess 26 adjacent the abutment 24 extending the entire length of the rear wall. An aperture 28 is provided in the rear wall in communication with the recessed portion 26.

The front wall or cover plate 22 has an interior surface constructed similarly to that of the rear wall 20. Accordingly, the interior surface of the front cover plate has an abutment surface 30, an adjacent, longitudinally extending recess 32 and an aperture 34 extending through the front plate and in communication with the recessed portion 32. It may be seen that in the simplest form of the cuvette assembly, with the abutment surfaces held in contact, the recesses 26 and 32 form an open ended chamber or through-passage 36 for holding the cuvette 14 in place. Further, the apertures 28 and 34 are positioned so that they are in substantial alignment when the cover plate 22 is moved to the closed position. This permits a light beam to transverse the housing through the apertures 28 and 34 and the cuvette 14.

In order to support the front cover plate 22 and provide a convenient means for positioning the cuvette with respect to the apertures, there is provided a pair of end walls 38 and 40 extending forwardly from, and perpendicularly to, the rear wall 20. The end walls 38 and 40 are provided with U-shaped slots 42 and 44, respectively. The slots are oriented generally perpendicular to the interior surface of the rear wall 20 and in horizontal alignment with the aperture 28. As best shown in FIG. 1, the rearmost extremities of the U-shaped slots are positioned approximately flush with the recessed surface 26 of the rear wall 20.

The front cover plate 22 is pivotally mounted between the end walls 38 and 40 by means of a longitudinal pin 46 extending through the end walls and the cover plate. With this arrangement, the front cover plate 22 is pivotally movable between its open and closed positions. In the open position, the disposable cuvette 14 is inserted in the U-shaped slots 42 and 44 and then held in place by closing the cover plate 22.

It will be appreciated that the width of the chamber or through-passage 36 in the housing formed by the recesses 26 and 32 is determined by the depth of the recesses. The width of the through-passage 36 relative to the diameter of the cuvette 14 is such that in the closed position of the cover plate 22, the cuvette is slightly compressed between the surfaces 26 and 32 so that the cuvette wall is deformed to define substantially planar, parallel front and rear cuvette wall portions. (See FIG. 4.) Although such compression or deformation of the cuvette is not essential, nevertheless it enhances the effectiveness and accuracy of the sample analysis by minimizing light scattering, interference and other losses which would be present if a curved surface were interposed in the light beam. In order to insure that the proper deformation of the cuvette wall will take place, that is, to insure the formation of parallel, planar cuvette wall sections, the height of the through-passage 36 is dimensioned so as to provide ample clearance for expansion of the cuvette wall in the upward and downward directions when the cuvette is compressed between the recessed surfaces 26 and 32.

In order to prevent localized deformation of the cuvette at the apertures 28 and 34 when the cover plate 22 is closed, there may be provided front and rear glass plates or windows 48 and 50 dimensioned to fit in the recesses 32 and 26, respectively. Preferably, the windows 48 and 50 are fabricated from optical grade glass and may be held in place in the recesses by applying small amounts of a silicone lubricant to their outer edges.

To control the amount of light incident on the sample in the cuvette 14, a slit plate 52 having a horizontal slit 53 may be positioned behind the rear glass window 50 in the recess 26. The depth of the recesses 26 and 32 must be sufficient, of course, to accommodate the elements 48, 50 and 52 and still provide the appropriate width for the through-passage 36.

Means for clamping together the rear wall 20 and the front cover plate 22 in the closed position is also provided. This may take the form of any suitable fastening, clamping or locking device. A preferred clamp comprises at least one channel-shaped element adapted to be pressed over the upper end portions of the rear wall and cover plate in the closed position of the cover plate. More specifically, the upper portions of the end walls 38 and 40 may be notched to receive a pair of clamping devices 54 and 56, respectively. The clamps 54 and 56 are pivotally mounted on the end walls 38 and 40, respectively, by pins 58 and 60 extending through the end walls and the depending legs of the channels.

The upper outside surfaces of the rear wall 20 and the front cover plate 22 are notched similarly to the end walls 38 and 40 to permit them to be straddled by the channel-shaped clamps whereby the abutments 24 and 30 are pressed into engagement. As best shown in FIG. 4, the surface 62 on the front cover plate 22 engaged by the clamps may be slightly inclined to provide a wedging action to insure that the abutment surfaces 24 and 30 will be firmly pressed together. Thus, there will be no variation in the width of the through-passage 36 between successive tests, so that a high degree of repeatability is maintained.

With the cuvette 14 locked inside the closed housing as shown in FIG. 2, a light beam 63, emanating from a source 64 and passing through the rear aperture 28, the slit plate 52, the rear window 50, the cuvette 14 and sample therein, the front window 48 and the front aperture 34, is received by a light sensitive transducer, such as a photoelectric cell 65, whereby the variations in light transmission or intensity, as a result of variations in the sample in the cuvette, may be detected and measured.

Magnetic mounting means are provided for the cuvette assembly on the rear surface of the rear wall 20. Referring to FIG. 5, the rear wall 20 is provided with a pair of counterbores 66 for receiving magnets 68 which are ground flush with the rear surface. The magnets 68 may be affixed in the counterbores 66 by any suitable means, e.g., an epoxy resin bonding agent.

Turning now to FIGS. 6–10, there is shown a slide plate assembly, generally designated by the reference numeral 70, for mounting the cuvette assembly 10 on an instrument 72 which will be described in greater detail below in connection with FIGS. 11 and 12, comprising a densitometer, a recorder and an integrator. The slide plate assembly 70 comprises generally a stationary support 74 securely attached to the instrument 72, a holder 76 slidably mounted on the support 74 for vertical movement between two limits, a reference filter pad 78 mounted on the holder 76 and a photocell assembly 80 secured to the stationary support 74. The support 74 is provided with a centrally located vertical groove 82 in the front face and a pair of spaced, vertically oriented, elongated recesses 84 in the rear surfaces on either side of the vertical groove 82. Centrally located in each recess 84 is a through-slot 86 considerably narrower and shorter than the recess 84. Just below the center of the support 74 and on the vertical center line is a hole 88 which permits a light beam to be directed through the support from the densitometer 72.

The holder 76 may be in the form of a plate-like element adapted to be slidably movable in a vertical direction on the support 74. The rear face of the holder 76 is in slidable contact with the front face of the support 74. The holder 76 is guided in its vertical travel by a centrally located vertical bar 90 which projects from the rear face of the holder 76 and rides in the groove 82. Referring to FIGS. 8 and 10 in particular, the holder 76 is biased against the support 74 by a pair of flat springs 92 disposed in the elongated recesses 84 and slidable vertically therein. A bolt 94 connects each flat spring 92 with the holder 76. Bolts 94 are tightened so as to substantially flatten the leaf springs 92 thereby providing the desired biased force. As shown in FIGS. 6–8 and 10, for example, the bolts 94 extend through the through-slots 86 and it may be seen that the vertical travel of the holder 76 is limited by the length of these slots.

The central portion of the holder 76 has milled into it a cut-away section 96 which is formed to provide a pair of ledges 98. Two holes 100 and 102 are provided on the vertical center line of the holder 76 to permit the light beam emanating from the densitometer 72 to pass through the holder. On either side of the hole 100 is mounted a steel striker plate 104 held in a counter bore formed in the holder 76. A pair of ears 106 extending from the lateral extremities of the holder 76 is provided for receiving a pair of handles 108 which permit manipulation of the holder by the operator.

Mounted on the front face of the support 74 and separated therefrom by a pair of spacers 110 is a photocell mounting bracket 112 which has a centrally cut out portion for receiving the photocell assembly 80.

Attached to the lower portion of the holder 76, with its lower surface flush with the lower edge of the holder and its upper surface just below a line joining the ledges 98 (FIGS. 6, 7 and 9), is the reference filter pad 78. The pad 78 has an internal cavity 116 adapted to receive a reference or zero filter 118 the optical density of which approaches the normal optical density of the sample. The purpose of this filter, which may be made interchangeable with other filters, is to set the approximate zero for a specific application. The reference filter pad 78 is provided with a rear aperture 120 in alignment with the hole 102 in the holder 76. Sandwiched between the zero filter 118 and the aperture 120 is a slit plate 122 for controlling the amount of light passing through the zero filter 118. The filter pad 78 is also provided with a front aperture 124 in alignment with the aperture 120.

The overall apparatus for measuring cardiac output is depicted in FIGS. 11 and 12. The instrument 72, inside the dashed line box, combines the functions of a densitometer, recorder and integrator and is similar to that described in U.S. Pat. No. 2,834,247, issued May 13, 1958 and entitled "Optical Density Analyzing Apparatus."

Radiant energy from the source 64 is concentrated by a focusing lens 130 on the sample flowing through the cuvette 14 in the housing 12. The beam 63 becomes monochromatic as it passes through a front filter 132. Simultaneously, a radiant energy beam 134, emanating from the same beam source 64, is focused on a comparison photoelectric cell 136 the output of which is connected in series with the output of the front, measuring cell 65. Beam 134 is directed through a rear neutral density filter 138 and an adjustable zeroing aperture 140 and passes by a cam-shaped shutter 142. The cam 142, rotated in a manner to be presently described, has a contour which varies so that the amount of light incident upon the comparison photoelectric cell 136 is dependent upon the position of the cam. The difference between the voltage outputs of the cells 65 and 136 appears on a line 144. This difference voltage is fed to a servo amplifier 146 which includes a chopper and an A.C. amplifier. The output signal from the amplifier 146 is proportional to the input signal and has a polarity which is related to the input signal. Consequently, if the output of the photoelectric cell 65 is greater than that of the photoelectric cell 136, the servo amplifier 146 will drive a servo motor 148, connected to the output of the servo amplifier 146, in a predetermined direction. On the other hand, if the output of the cell 136 is greater than that of photoelectric cell 65, then the servo amplifier 146 will drive the motor 148 in the opposite direction. If the photoelectric cells 65 and 136 are identical, then the servo motor 148 will rotate the balancing cam 142 to a position where the illumination of the two photocells is equal. As the dyed sample flows through the cuvette 14 and the dye concentration varies, the servo motor 148 will drive the cam 142 accordingly and maintain the difference voltage on line 144 substantially equal to zero. By properly selecting the contour of the cam 142, it is possible to make the angular position of the cam 142 represent any desired mathematical function.

The servo motor 148 also drives a recording pen 149 and an integrator wheel 150, rotatably mounted on a carriage 151. The recording pen 149 moves linearly across a chart 152 as the cam 142 is rotated. The integrator wheel 150 is moved back and forth by means of a rack and pinion drive 153 across an integrating disk 154 in a manner to give an output which is proportional to the area under the curve 155 plotted by the recording pen 149. A synchronous or constant speed motor 156 drives the integrating disk 154 through a set of bevel gears 157 and a shaft 158. The motor 156 also drives the chart 152 through the bevel gears 157, worm drive 159, bevel gears 160 and associated shaft elements 161, 162, 163 and 164.

The integrator 150 mechanically drives an integrating pen 168 which produces a saw-tooth trace 170 on the chart 152 underneath the dye concentration curve 155. A saw-tooth generator, in the form of a ratchet wheel 172, mounted on the same shaft supporting the integrator wheel 150, mechanically actuates the integrator pen 168 by means represented by the dotted line. The mechanism for accomplishing this is described in the above-referenced U.S. Pat. No. 2,834,247 and shown in detail in FIGS. 4, 8 and 9 of that patent. In operation, as the cam 142 moves to reduce the illumination on the comparison cell 136, the integrator 150 is moved toward the periphery of the integrating disk 154, thereby rotating at a greater angular velocity. This causes a greater number of saw-tooth cycles to occur during a given time period. In other words, the greater the area under a particular portion of the dye concentration curve 155, the greater will be the number of corresponding saw-tooth cycles generated.

To obtain cardiac output with the present apparatus, one end of the cuvette 14 is connected to the arterial catheter and the other end to an infusion-withdrawal pump, disposable syringe or other suitable device for assisting in the withdrawal of blood from the subject. With the holder 76 at the upper limit or in the stand-by position, as depicted in FIG. 6, the zero filter 118 is in the optical path and a reference trace may be made. With the holder still at its upper limit, the cuvette assembly 10 is inserted in the cut-away section 96 of the holder 76, the lower surface of the assembly resting on the ledges 98 and the magnets 68 engaging the steel striker plates 104. With this orientation, the apertures 28 and 34 will be in alignment with the upper hole 100 in the holder 76. In order to make a run, the holder 76 is moved to its lower limit in which the cuvette assembly 10 is introduced into the light path. A known quantity of dye is then injected into a vein using any preferred catheter system. The dye circulates through the cardio-vascular system and is withdrawn from the arterial puncture downstream. The infusion-withdrawal pump draws the blood-type mixture at a constant rate through the cuvette. The optical section of the instrument 72 scans the optical density of the mixture and the results are presented as the curve 155 on the moving paper chart 152. This curve is linear with the concentration of the dye in the bloodstream. At the same time, the densitometer's mechanical integrator 150 computes the area under the curve, adding the saw-tooth pattern 170 at the bottom of the chart 152. With the aid of a nomogram, the operator or the physician then briefly calculates the cardiac output from these and other known factors. Since the cuvettes are presterilized and disposable and the dye is non-toxic, the blood used to obtain the curve (averaging 30 ccs. or less) can be reinjected without danger if normal sterilization techniques are used.

What is claimed is:

1. A flow-through cuvette assembly, comprising
a first, rectangularly-shaped plate having a face and end walls projecting perpendicularly from said face, said face being provided with a longitudinal, recessed portion extending between said end walls, an aperture extending through said plate in communication with said recessed portion, said end walls having U-shaped slots positioned in substantial longitudinal alignment with said aperture, the closed ends of said U-shaped slots being substantially flush with said recessed portion;

a glass window mounted in said recessed portion of said first plate;

a second, rectangularly-shaped plate having a face provided with a longitudinal recessed portion extending the length of said plate, an aperture extending through said plate in communication with said recessed portion, said second plate being pivotally mounted between said projecting end walls and movable between open and closed positions, said apertures in said plates being in alignment when said second plate is in said closed position;

a glass window mounted in said recessed portion of said second plate;

a flexible, pre-sterilized, disposable flow-through tube disposed in said U-shaped slots and having ends extending from said end walls, said tube being sandwiched between said glass windows and passing by said apertures; and a channel-shaped clamp, pivotally mounted on each end wall and movable between open and closed positions, in said open position permitting the insertion and removal of said tube and in said closed position the channel portion of said clamp clamping together said plates so as to slightly compress said flow-through tube between said glass windows thereby forming parallel, substantially planar portions in the tube wall.

2. A housing comprising a first, rectangularly-shaped plate having a face and end walls projecting perpendicularly from said face, said face being provided with a longitudinal, recessed portion extending between said end walls, an aperture extending through said plate in communication with said recessed portion, said end walls having U-shaped slots positioned in substantial longitudinal alignment with said aperture for receiving a tube, the closed ends of said U-shaped slots being substantially flush with said recessed portion;

a second, rectangularly-shaped plate having a face provided with a longitudinal recessed portion extending the length of said plate, an aperture extending through said plate in communication with said recessed portion of said second plate, said second plate being pivotally mounted between said projecting end walls and movable between open and closed positions, said apertures in said plates being in alignment when said second plate is in said closed position;

first and second flat, glass windows mounted in said recessed portions of said first and second plates, respectively; and a channel-shaped clamp, pivotally mounted on each said end wall, movable between open and clamping positions, for clamping together said plates in said closed position.

References Cited

UNITED STATES PATENTS

| | | | |
|---|---|---|---|
| 2,258,073 | 10/1941 | Stevens | 356—246 |
| 2,339,053 | 1/1944 | Coleman. | |
| 2,455,810 | 12/1948 | Ryan. | |
| 2,706,927 | 4/1955 | Wood. | |
| 2,834,247 | 5/1958 | Pickels. | |
| 2,967,946 | 1/1961 | Leisey | 250—218 |
| 3,035,481 | 5/1962 | Jones et al. | |
| 3,363,503 | 1/1968 | Shifrin. | |
| 1,191,172 | 7/1916 | Fuller | 292—202 |
| 1,278,645 | 9/1918 | Heilmann | 292—202 |
| 2,835,252 | 5/1958 | Mauchel | 356—39 |
| 3,272,568 | 9/1966 | Koorneef et al. | 308—5 |
| 3,367,230 | 2/1968 | Williams | 356—209 X |

OTHER REFERENCES

"Femoral Artery Flow, Limblood Volume and Cardiac Output Thru Continuously Recorded Indicator-Dilution Curves," J. H. Hobbs et al., Ann. Surg., vol. 158, August 1963, pp. 159–160.

"Instrument For Measuring Cardiac Output," J. T. Hobbs, Lancet, May 23, 1964, pp. 1140–1141.

RONALD L. WIBERT, Primary Examiner

R. J. WEBSTER, Assistant Examiner

U.S. Cl. X.R.

128—2.05; 292—202; 356—39, 40, 246